United States Patent [19]

Nakamura

[11] Patent Number: 5,301,256
[45] Date of Patent: Apr. 5, 1994

[54] STATE SPACE SEARCH SYSTEM

[75] Inventor: Shizuka Nakamura, Tokyo, Japan

[73] Assignee: Mitsubishi Denki Kabushiki Kaisha, Tokyo, Japan

[21] Appl. No.: 946,105

[22] Filed: Sep. 17, 1992

[30] Foreign Application Priority Data

Sep. 20, 1991 [JP] Japan .................. 3-268852

[51] Int. Cl.$^5$ ............................................. G06F 15/00
[52] U.S. Cl. ...................................... 395/10; 395/13
[58] Field of Search ...................... 395/23, 22, 13, 10

[56] References Cited

U.S. PATENT DOCUMENTS

| 3,214,745 | 5/1993 | Sutherland | 395/23 |
|---|---|---|---|
| 5,078,952 | 1/1992 | Gozani et al. | 395/22 |
| 5,119,468 | 6/1992 | Owens | 395/22 |
| 5,148,513 | 9/1992 | Koza et al. | 395/13 |
| 5,214,715 | 5/1993 | Carpenter et al. | 395/23 |

OTHER PUBLICATIONS

Dahl, Edward.; "Accelerated Learning using the Generalized Delta Rule"; IEEE First International Conference on Neural Networks; (FICNN) 21-24 Jun. 1987; pp. 523-530.
Almedia, Luis; "A learning rule for asynchronous perceptions with feedback in a combinatorial environment"; IEEE FICNN; 21-24 Jun. 1987; pp. 609-618.
Williams, Ronald J.; "A Class of Gradient-Estimating Algorithms for Reinforcement Learning in Neural Networks"; IEEE FICNN; Jun. 21-24 1987; pp. 601-608.
Hush, D. R. and Salas, J. M.; "Improving the Learning Rate of Back-Propagation with the Gradient Reuse Algorithm"; IEEE ICNN, Jul. 24-27 1988; pp. 441-446.
Vogl, T. P. and Mangis, J. K. and Rigler, A. K. and Zink, W. T. and Alkon, D. L.; "Accelerating the Convergence of the Back Propagation Method; Biological Cybermetics"; 1988; pp. 257-263.
Naifax; H. L.; Nasiruddin, M.; Sarrad. T.; "Effect of Weights on Back-Propagation and its Variations"; IEEE Int. Conf. On Systems, Man and Cybernotics; Nov. 14-17 1989; pp. 218-219.
Dajani, A. L. and Kamel, M. and Elmasvy, M. L.; "Gradient Methods in unsupervised Veunal Networks"; IEEE Int. Conf. on Neural Nets; Nov. 18-21 1991; pp. 1770-1775 vol. 2.
Edmonson, William; "Recursive Algorithm for State Space Spectrum Estimation", Fifth ASSP Workshop on Spectrum Estimation and Modeling; Oct. 10-12, 1990; pp. 265-269.
"Problem Space Search Using Steepest Descent Method"; S. Nakamura, Japanese Institute of Electrical Engineers, pp. 21-30, Sep. 30, 1991.
"Artificial Intelligence Handbook"; Artificial Intelligence Society of Japan; p. 27, Ohm-sha, 1990, Tokyo.

Primary Examiner—Michael R. Fleming
Assistant Examiner—Tariq R. Hafiz
Attorney, Agent, or Firm—Leydig, Voit & Mayer

[57] ABSTRACT

A state space search system searches for an optimal goal state by searching in the direction of a steepest descent with respect to an evaluation function. When the search becomes impossible upon reaching a local minimum of the evaluation value, the evaluation value is increased to continue the search in the direction of steepest descent.

4 Claims, 4 Drawing Sheets

FIG. 4

| SEARCH No | STATE | EVALUATION | COMPENSATED EVALUATION VALUE |
|---|---|---|---|
| 0 | A B C / 8 10 4 / 5 7 5 / a b c | 1 | 1→6 |
| 1 | A B C / 8 10 4 / 5 7 5 / a b c | 2 | 2→12 |
| 2 | A B C / 8 10 4 / 5 7 5 / a b c | 4 | 4 |
| 3 | A B C / 8 10 4 / 5 7 5 / a b c | 0 | 0 | ns
STATE SPACE SEARCH SYSTEM

BACKGROUND OF THE INVENTION

This invention relates to systems and methods for searching a state space, i.e., a set of a plurality of states or combinations, and more particularly to methods of solving combinatorial optimization problems by which the optimal combination is discovered from among the possible combinations.

FIG. 1 is a flowchart showing a conventional breadth-first search algorithm for searching a state space, which is discussed in: Nils J. Nilsson, "Problem Solving Methods in Artificial Intelligence", Mcgraw-Hill Publications, New York, 1971. The state space is searched using two lists, OPEN and CLOSED, which hold the nodes of the state space whose neighbors are going be examined and those whose neighboring nodes have already been examined, respectively. After initialization, these two lists, OPEN and CLOSED, are successively updated to find out the goal node.

Thus at step S11, the list OPEN is initialized to hold a start state S. Further, the list CLOSED is initialized to null (i.e., a list having no elements). Next, at step S12, it is judged whether or not the list OPEN is null. When the list OPEN becomes null at step S12, the search fails. As long as there remains nodes in OPEN, the search continues. At step S13, the first node is taken out from the list OPEN, put in the list CLOSED, and named as node n. At step S14, extension or continuation nodes of node n, namely, the neighbors of node n (the nodes to which a direct transition from node n is possible) which are not contained in either OPEN or CLOSED, are appended after the tail of the list OPEN. Further, the pointer to node n is stored such that the fact that these nodes result from transitions from the node n is stored. At step S15, it is judged whether or not a goal node exists among the extension nodes, which have been added to the tail of list OPEN. If there is, the search succeeds. If not, the execution returns to step S12 and the search is continued until either success or failure of the search is determined.

As described above, the node or state at the head of the list OPEN is taken out as the current state (step S13), and then the neighboring states of the current state which have not yet been examined are added to the list OPEN (step S14). Finally, either success or failure of search is determined at step S15 or step S12.

The above conventional state space search method, however, has the following disadvantage. Since all the unexamined neighboring states of the current state or node n are added to the list OPEN, the requirement for the storage capacity for the list OPEN becomes enormous. Further, since the search is uninformed, the efficiency of the search is low. Thus, it has already been proposed to evaluate the states added to the list OPEN by means of an evaluation function. Then, however, the discovery of the optimum solution is not guaranteed.

SUMMARY OF THE INVENTION

It is therefore an object of this invention to provide a state space search system by which the search can be effected efficiently with a small amount of memory, and all the same by which the discovery of the optimum solution in sufficient search is guaranteed.

The above object is accomplished in accordance with the principle of this invention by a state space search system for searching for a goal state within a state space consisting of a plurality of states, the state space being provided with: a transition rule defining neighboring states of each state; and an evaluation function for evaluating respective states; wherein: search is made in a direction of steepest descent with respect to an evaluation value of the evaluation function; and, when search in the direction of steepest descent becomes impossible upon reaching a local minimum evaluation value of the evaluation function, the evaluation value is increased to continue the search in the direction of steepest descent.

More specifically, the state space search system searches the state space in accordance with a method comprising the steps of:

(a) initializing a current state and evaluating the current state by means of the evaluation function;

(b) determining neighboring states of the current state and evaluating the neighboring states by means of the evaluation function;

(c) selecting a minimally evaluating neighboring state as next state;

(d) determining whether or not the next state is a goal state, search being terminated if the next state is a goal state;

(e) judging whether or not an evaluation value of the next state is smaller than an evaluation value of the current state;

(f) increasing the evaluation value of the current state to a value greater than the evaluation value of the next state;

(g) updating the current state to the next state; and (h) repeating the steps (b) through (g).

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4 is a table showing the progress of the successive states of the power supply system of FIG. 3 during the search according to this invention.

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

First, however, before embarking upon detailed description of the state space search system according to this invention, the principle of this invention is summarized.

As discussed in the present inventor's recent article: S. Nakamura, "Problem Space Search using Steepest Descent Method", PE-91-33, Denki Gakkai (Japanese Institute of Electrical Engineers), pp. 21 through 30, the state space search system according to this invention is based on an evaluation function. The state space (also called problem space) is searched toward the direction of steepest descent with respect to the evaluation function. When the search becomes stationary upon reaching a local minimum, the evaluation value thereof is increased to continue the search. Thus, in summary:

(1) The search of the state space is effected by repeating transitions to the neighboring states.

(2) An operator (i.e., the rule of transition from one state to its neighbor) is defined such that: (a) for any state, at least one transition to a neighboring state is allowed, and that (b) for the states other than the optimum state, it is guaranteed that a transition by which the optimum state is approached exists among the allowed transitions.

(3) The transition to a neighboring state is selected which reduces the evaluation function most among the allowed transitions.

(4) When a local minimum is reached and the search cannot be continued by the rule (3) above, the evaluation function value of the current state is increased (the value of the evaluation function of the current state is increased to a value which is greater than those of the neighboring states by a predetermined allowance) such that the transitions according to (3) above again become feasible.

(5) The optimal allowable solution or state is stored which has hitherto been found on the basis of the evaluation values of the states which are traversed during the above search process.

(6) The search is terminated when the number of searches reaches the upper limit determined by the allowable length of processing time. If, however, the judgment as to whether a state is an optimum solution or not is possible, the search is terminated upon discovery of the optimum solution.

In the above summary description, it has been assumed that the smaller values of the evaluation function generally indicate better states closer to the goal. However, if the evaluation function is such that the greater value thereof indicates better states, the adjustment of the evaluation value in (4) is effected to decrease the evaluation value instead of increasing it, and the transition in (3) is effected to increase the evaluation function the most among the allowed transitions.

Figure 3:
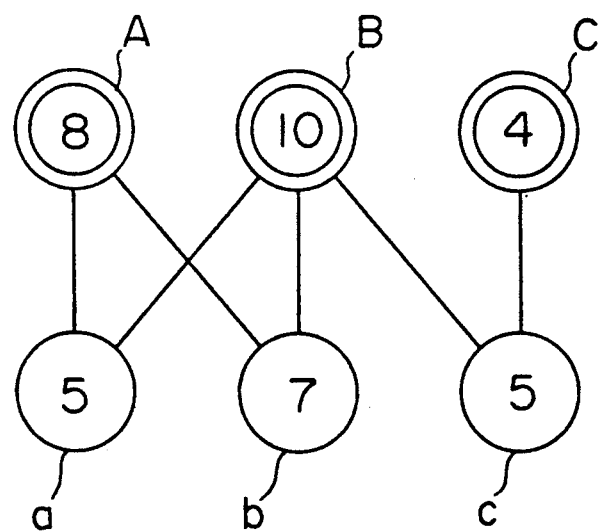
FIG. 3 is a diagram showing a power supply system to which the state space search method according to this invention may be applied.

FIG. 3 is a diagram showing a power supply system to which the state space search method according to this invention may be applied. The power supply system includes three power sources A, B, and C, and three loads, a, b, and c. The numbers within the double circles represent the respective capacities of the sources in an arbitrary unit: power source A has a capacity of eight (8); power source B has a capacity of ten (10); and power source C has a capacity of four (4). The numbers within the single circles represent the respective values of the loads in the same arbitrary unit: load a amounts to five (5); load b amounts to seven (7); and load c amounts to five (5).

The possible connections between the power sources and the loads are indicated by the lines connecting them to each other. Thus, load a can be connected to either A or B; load b can be connected to either A or B; and load c can be connected to either B or C. Further, it is assumed that each load can be connected to only one of the power sources at a time. For example, it is assumed that load a is connected either power sources A or B, but not both. Under this assumption, the state space consists of eight states 1) through 8):

1) a-A, b-B, c-C;
2) a-A, b-B, c-B;
3) a-A, b-A, c-C;
4) a-A, b-A, c-B;
5) a-B, b-B, c-C;
6) a-B, b-B, c-B;
7) a-B, b-A, c-C;
8) a-B, b-A, c-B.

The dashes between power sources and loads indicate that they are connected. Thus, the state 1), for example, represents that the loads a, b, and c are connected to the power sources A, B, C, respectively.

Further, the (Hamming) distance between two states is defined as the number of different connections. For example, the distance between state 1) and 2) is one, since only the connection for the load c is different for the two states. On the other hand, the distance between state 1) and 8) is three, since all the three connections are different in the two states. On the basis of the above definition of the distance between states, the operator or the transition rule is defined as follows: A transition from a state to another is allowed if and only if the distance between the two states is equal to one. Thus, according to this transition rule, a state has generally three neighboring states connected to it via edges representing the allowed transitions.

Further, the evaluation function is defined as the sum of overloads for the power sources A through C. Thus, for example, evaluation value of the state 1) on the basis of the evaluation function is one, since power source C is overloaded by one, while other power sources are loaded under their respective capacities. State 2), on the other hand, evaluates to two by the evaluation function, since power source B is overloaded by two and no other power sources are overloaded. The evaluation value zero of the evaluation function indicates that there is no overload for the power sources. Thus, if a state is evaluated to zero by the evaluation function, the state is an allowable solution.

Figure 1:
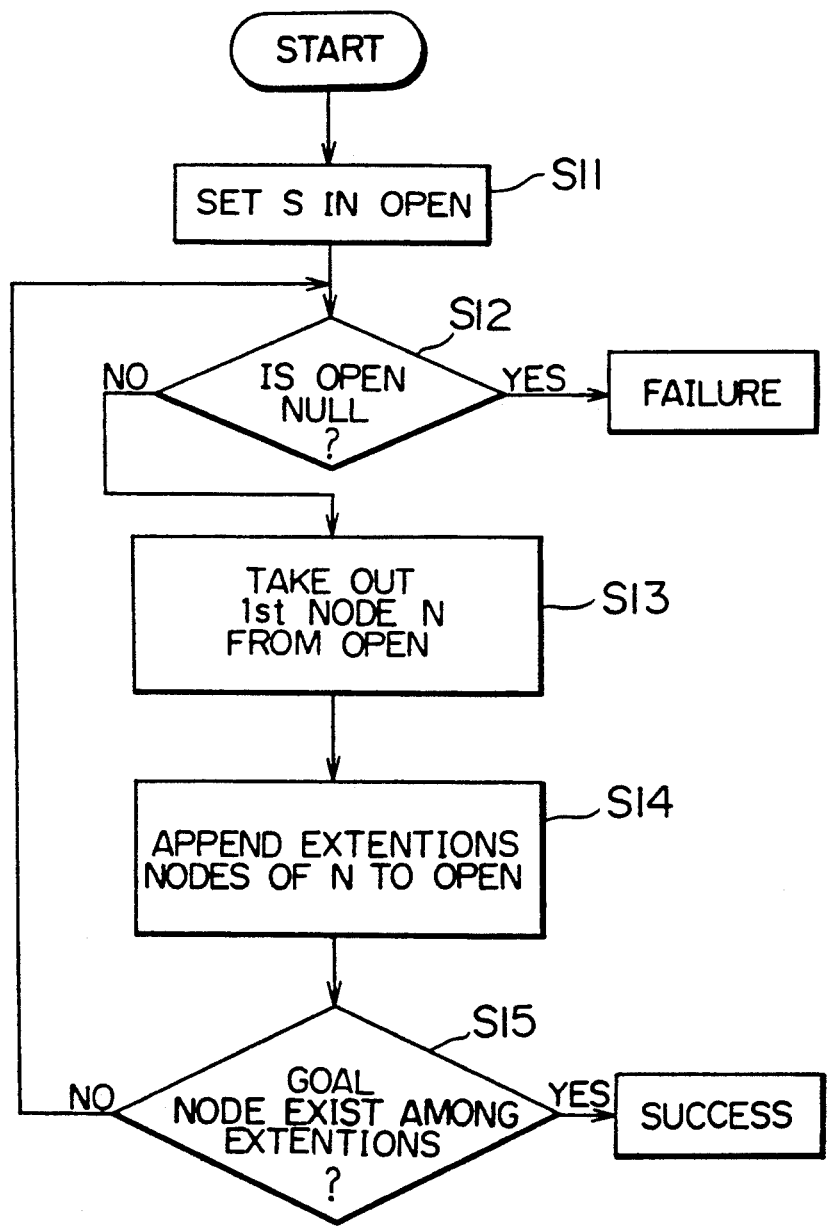
FIG. 1 is a flowchart showing a conventional breadth-first search algorithm for searching a state space.
Figure 2:
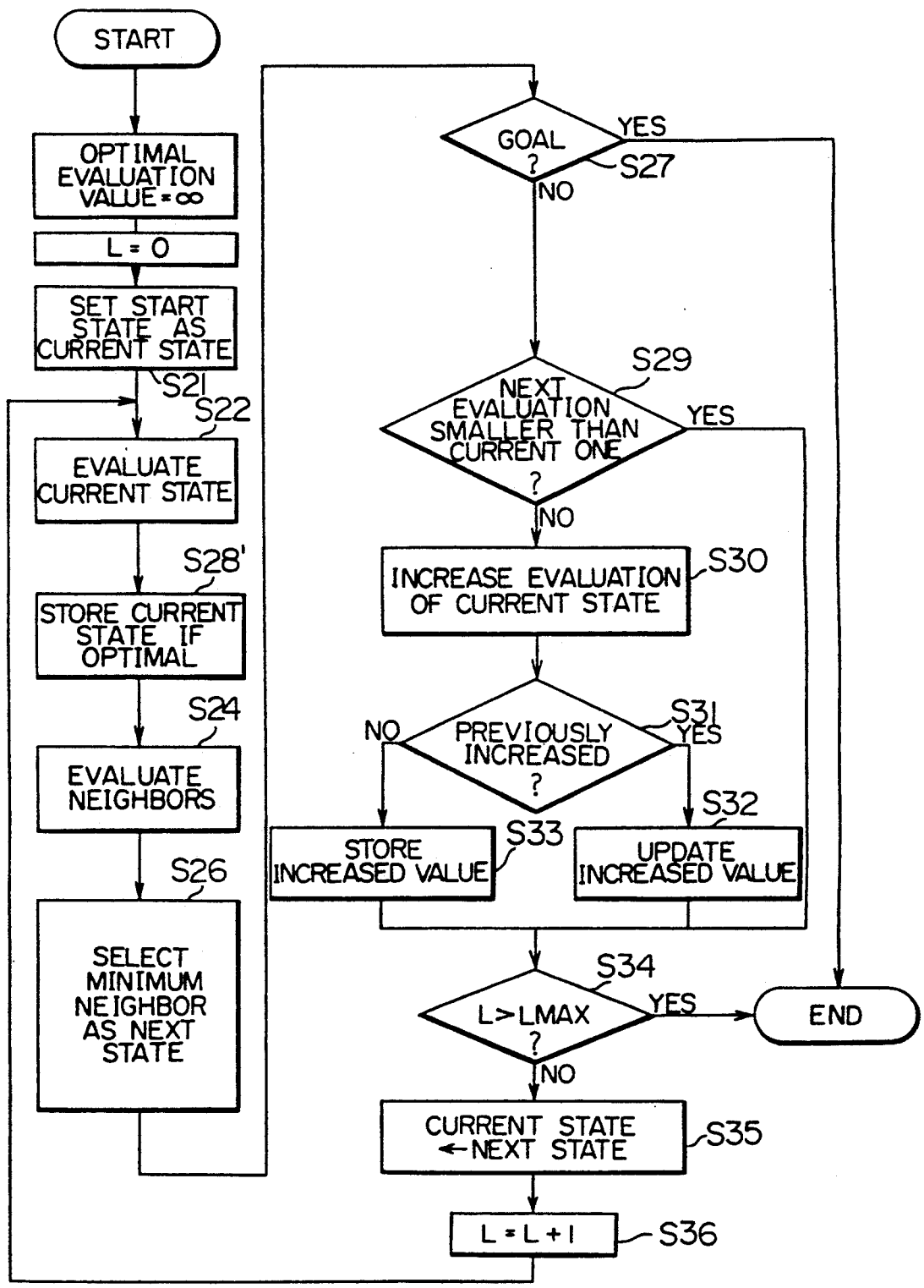
FIG. 2 is a flowchart showing the search procedure according to this invention.

Next, a specific embodiment of this invention is described by reference to FIGS. 2 through 4. FIG. 2 is a flowchart showing the search procedure according to this invention. FIG. 4 is a table showing the progress of the successive states of the power supply system of FIG. 3 during the search according to this invention.

First, the value of infinity ($\infty$) is stored as the initial optimal evaluation value, and the counter variable L, for storing the number of searches up to the present moment, is initialized to zero: L=0.

Further, at step S21, the start state is set. The start state is the initial current state. It is assumed that the state 1) as specified above is selected as the start state.

Next, at step S22, the current state, which is the state 1), is evaluated. The evaluation value of the current state is compensated for in the case where the current state has been traversed previously and the evaluation value thereof has been increased at step S30 through step S33, as described below. The state 1) evaluates to one, since power source C is overloaded by one and no other power sources are overloaded.

At step S28', the optimal evaluation value and the evaluation value of the current state are compared, and the better state (the state with the smaller evaluation value) is stored with the evaluation value of the optimal one.

At step S24, all the neighboring states of the current state (the states to which the transition from the current state is allowed by the transition rule) are determined and evaluated. For example, for the current state 1), there are three neighboring states, 2), 3) and 5), which evaluate to two, five, and three, respectively. The evaluation values of the neighboring states are compensated for in the case where the neighboring states have been traversed previously and the evaluation values thereof have been increased at step S30 through step S33, as described below. When, as in the present embodiment, a smaller value of the evaluation function indicates a better state closer to the goal, the evaluation values of the neighboring states are increased. In the first execution cycle of the procedure of FIG. 2, however, no compensations are made, since no previous increases of the evaluation values have been made. At step S26, the neighboring state which exhibits the smallest evaluation value among the neighbors of the current state is selected as the next state. In the first execution cycle, the state 2) having the evaluation value two is selected among the neighboring states of the current state 1).

At step S27, it is judged whether or not the next state is the goal or an allowable solution. If the judgment is affirmative, the search succeeds and the procedure of FIG. 2 is terminated. If the judgment is negative, the execution proceeds to next step S29. In the first execution cycle, the evaluation value of the next state, which is the total overload of the power sources in state 2), is equal to two. Thus, the next state is not an allowable solution. Thus, the execution proceeds to step S29.

At step S29, it is judged whether or not the evaluation value of the next state is smaller than the evaluation value of the current state. Namely, when, as in the present embodiment, a smaller value of the evaluation function indicates a better state closer to the goal, it is judged whether or not the evaluation value of the current state is a local minimum, and hence is in need of an increase of the evaluation vlaue of the current state. If the evaluation value of the current state is not a local minimum and thus the evaluation value of the next state is smaller than the evaluation value of the current state, the judgment at step S29 is affirmative. If, on the other hand, the current state is a local minimum, the judgment at step S29 is negative. Thus, if the judgment is affirmative at step S29, the execution proceeds directly to step S34. Otherwise, the execution proceeds to the steps S30 through S33. In the first execution cycle, the evaluation value of the next state is two, while the evaluation value of the current state is one. Thus, the judgment is negative at step S29, and the execution proceeds to step S30.

At step S30, the evaluation value of the current state is increased in the case of the present embodiment. More specifically, the evaluation value of the current state is multiplied by six in this example. At step S31, it is judged whether or not an increase of the evaluation value of the current state has been made previously. As described below, the states whose evaluation values have been increased are stored, together with the original and the increased evaluation values thereof. Thus, at step S31, it is judged whether or not the current state exists among those whose evaluation values have been adjusted up to the present. If the judgement is affirmative, the execution proceeds to step S32. Otherwise, the execution proceeds to step S33.

At step S33, the increased evaluation value, as well as the original evaluation value, are stored together with the current state. At step S32, on the other hand, the newly increased value of the current state, whose evaluation value has been increased and stored during a previous search process up to the present, is updated.

At step S34, it is judged whether or not the value of the counter variable L is greater than a predetermined max, LMAX. If the judgment is affirmative, the search is terminated. Otherwise the execution proceeds to step S35, where the current state is updated. Namely, the previous "next state" is set as the "current state".

Then, after the counter variable L is incremented at step S36, the execution returns to step S22 to repeat the steps S22 through S36. The execution cycles of steps S22 through S36 are repeated until the goal is finally discovered at step S27, or the number of searches exceeds the predetermined maximum at step S34.

In the case of the present embodiment, the current state is state 1) and the next state is state 2) during first execution cycle of steps S24 through S34. During the second execution cycle, the current state is state 2) and the next state is state 4). Since state 2) evaluates to two and state 4 evaluates to four, the evaluation value of the current state is increased (i.e., multiplied by six) at step S30. During third execution cycle, the current state is state 4) and the next state is state 8). Since state 8) evaluates to zero and hence provides an allowable solution, the judgement at step S27 becomes affirmative during the third execution cycle, and the search succeeds.

The progress of search is illustrated in FIG. 4, where: the state at search No. 0 corresponds to the current state during the first execution cycle; the state at search No. 1 corresponds to the current state during the second execution cycle; and the state at search No. 2 corresponds to the current state during the third execution cycle. On the other hand, the state at search No. 3 corresponds to the next state during the third execution cycle.

In the case of the above embodiment, the evaluation value of states directly indicates whether or not the states are allowable solutions. Generally, however, this is not necessary. the only requirement is that the evaluation function gives an evaluation or the likelihood of the state's allowability as a solution, such that the probability of approaching the goal state is maximized when a transition is made in the direction of steepest descent. The allowability of a state as a solution may be determined by a distinct criterion or judgment rule that is given separately from the evaluation function. Then, the judgment at step S27 is made by reference to such a criterion. Further, it goes without saying that this invention applies to the case where a greater value of the evaluation function indicates a better state closer to the goal. However, for the sake of brevity, the specific terms for the above case, such as "the steepest descent", are used to represent both cases.

What is claimed is:

1. A state space search method for searching for a goal state within a state space consisting of a plurality of states, said state space search method comprising the steps of:
   selecting a state for searching;
   determining current neighboring states of state under search according to a transition rule;
   determining an evaluation value of the state under search according to an evaluation function;
   comparing evaluation value of the current state under search with a predetermined evaluation value of the goal state;
   determining evaluation values of the neighboring states according to the evaluation function when the evaluation value of the current state under search is different from the predetermined value; and designating a neighboring state as a next state under search when the evaluation value of the current state under search is different from the predetermined value, the neighboring state having a minimum evaluation value amongst the evaluation values of the neighboring states and the current state under search.

2. A state space search system for searching for an optimal goal state within a state space comprising a plurality of states, and state space search method comprising the steps of:

(a) initializing a current state and evaluating said current state by means of an evaluation function;

(b) determining neighboring states of said current state according to a transition rule; evaluating the neighboring states by means of the evaluation function;

(c) selecting neighboring state having a minimum evaluation value of a next state;

(d) determining whether the next state is a goal state, the search being terminated if the next state is a goal state;

(e) judging whether an evaluation value of the next state is smaller than an evaluation value of the current state;

(f) increasing the evaluation value of the current state to a value greater than the evaluation value of the next state;

(g) updating the current state to the next state; and (h) repeating steps (b) through (g).

3. A state space search method for searching for a goal state within a state space comprising a plurality of states, said state space search method comprising the steps of:

selecting a current state for search;

determining an evaluation value of the current state according to an evaluation function;

determining neighboring states of the current state according to a transition rule;

comparing the evaluation value of the current state with a predetermined evaluation value of the goal state;

determining evaluation values of the neighboring states according to the evaluation function when the evaluation value of the current state is different from the predetermined evaluation value of the goal state; and selecting a neighboring state having an extreme evaluation value amongst the evaluation values of the neighboring states and the current state for search when the evaluation value of the current state is different from the predetermined evaluation value of the goal state, wherein an extreme evaluation value is defined as a minimum or a maximum value.

4. A state space search method according to claim 3 further comprising the step of adjusting the evaluation value of the current so that the evaluation value of the current state is less extreme than the most extreme evaluation value of any of the neighboring states prior to the step of selecting a neighboring state.

* * * * *

UNITED STATES PATENT AND TRADEMARK OFFICE
CERTIFICATE OF CORRECTION

PATENT NO. : 5,301,256
DATED : April 5, 1994
INVENTOR(S) : Nakamura

It is certified that error appears in the above-indentified patent and that said Letters Patent is hereby corrected as shown below:

On the Title Page:

In Item [56] References Cited, change "3,214,745" to --5,214,745--.

In Claim 2, column 7, line 22, change "of" to --as--.

Signed and Sealed this

Second Day of August, 1994

Attest:

BRUCE LEHMAN

Attesting Officer      Commissioner of Patents and Trademarks